United States Patent
Marchlewski et al.

(10) Patent No.: US 9,770,976 B1
(45) Date of Patent: Sep. 26, 2017

(54) FILLER PIPE BRACKET ASSEMBLY OF PICKUP TRUCK

(71) Applicant: Ford Global Technologies, LLC, Dearborn, MI (US)

(72) Inventors: Jack Marchlewski, Saline, MI (US); John Comiez, Novi, MI (US); Dennis G. Slevin, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/138,247

(22) Filed: Apr. 26, 2016

(51) Int. Cl.
*B60K 15/04* (2006.01)
*B60K 15/05* (2006.01)
*B62D 33/02* (2006.01)

(52) U.S. Cl.
CPC .............. *B60K 15/04* (2013.01); *B60K 15/05* (2013.01); *B62D 33/02* (2013.01); *B60K 2015/0467* (2013.01); *B60K 2015/0474* (2013.01)

(58) Field of Classification Search
CPC .... B60K 2015/0467; B60K 2015/0474; B60K 2015/016; B60K 2015/03453; B60K 2015/03528; B60K 2015/04; B60K 15/047; B62D 33/02; B62D 21/16; B62D 29/008
USPC ....................................................... 296/97.22
See application file for complete search history.

(56) References Cited

U.S. PATENT DOCUMENTS

| | | | |
|---|---|---|---|
| 3,586,363 A * | 6/1971 | Omlid | B60K 15/00 137/575 |
| 4,448,323 A | 5/1984 | Hayashi et al. | |
| 4,573,694 A | 3/1986 | Goto et al. | |
| 4,852,892 A * | 8/1989 | Reid | B60K 15/073 137/874 |
| 7,173,474 B1 * | 2/2007 | Edwards | H03K 17/0422 327/374 |
| 7,594,583 B2 | 9/2009 | Whipple | |
| 8,167,009 B2 * | 5/2012 | Vandervoort | B60K 15/0406 123/1 A |
| 9,145,176 B1 * | 9/2015 | Van Wyk | B62D 29/008 |
| 9,227,675 B1 * | 1/2016 | Elquest | B62D 33/033 |
| 9,556,772 B2 * | 1/2017 | Mitobe | F01N 3/20 |
| 9,662,973 B2 * | 5/2017 | Betzen | B60K 15/05 |

(Continued)

FOREIGN PATENT DOCUMENTS

EP 1 852 297 A1 11/2007
FR 3021383 A1 11/2015

OTHER PUBLICATIONS

Picture from the unveiling of the 2015 Ford F-150 on Jan. 13, 2016.*

*Primary Examiner* — Gregory Blankenship
(74) *Attorney, Agent, or Firm* — Jason Rogers; Brooks Kushman P.C.

(57) ABSTRACT

A filler pipe bracket of an aluminum pickup truck includes a two-tiered body, a first side member, and a second side member. The two-tiered body includes a first layer defining a first pipe aperture and a second layer defining a second pipe aperture. The first side member extends from the first layer and includes a first mount flange oriented for securing to a portion of an inner pickup box frame. The second side member extends from the second layer and includes a second mount flange for fastening to another portion of the inner pickup box frame. The first pipe aperture may be sized to receive a diesel fuel pipe and the second pipe aperture may be sized to receive a diesel exhaust fluid pipe.

19 Claims, 5 Drawing Sheets

(56) References Cited

U.S. PATENT DOCUMENTS

| | | | |
|---|---|---|---|
| 2008/0308180 A1* | 12/2008 | Baudoux | B60K 15/04 141/349 |
| 2011/0227370 A1* | 9/2011 | Yasuda | B60K 15/04 296/193.06 |
| 2011/0298245 A1* | 12/2011 | Jarocki | B62D 21/03 296/193.07 |
| 2013/0192714 A1* | 8/2013 | Wagner | B60K 15/04 141/98 |
| 2013/0249234 A1* | 9/2013 | Higgins | B60K 15/05 296/97.22 |
| 2013/0292386 A1* | 11/2013 | Klauer | B60K 13/04 220/553 |
| 2014/0070561 A1* | 3/2014 | Jakobs | B60K 15/03177 296/97.22 |
| 2014/0191498 A1* | 7/2014 | Shipp | B60K 15/067 280/834 |
| 2014/0209616 A1* | 7/2014 | Balzer | B60K 15/0406 220/562 |
| 2014/0319134 A1* | 10/2014 | Olsen | B60S 1/50 220/86.2 |
| 2015/0291021 A1* | 10/2015 | Ogiwara | B60K 15/04 220/562 |
| 2015/0360727 A1* | 12/2015 | Miwa | B60K 15/01 280/124.109 |
| 2016/0031313 A1* | 2/2016 | Legueux | B60K 13/04 180/54.1 |
| 2016/0325621 A1* | 11/2016 | Le-Tinnier | B60K 15/04 |

* cited by examiner

FILLER PIPE BRACKET ASSEMBLY OF PICKUP TRUCK

TECHNICAL FIELD

The present disclosure relates to assemblies for reinforcing a filler pipe bracket assembly of aluminum pickup truck boxes.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box body panels may often be made from steel sheet metal which may be formed in a draw operation. Characteristics and properties of the steel sheet metal provide multiple options for forming vehicle components. Aluminum sheet metal does not share the same or similar formability characteristics and properties as steel sheet metal. While weight advantages may be obtained by using aluminum sheet metal instead of steel sheet metal, certain constraints relating to the formability of aluminum may require additional structural reinforcement or alternative mount scenarios for vehicle components.

SUMMARY

An aluminum pickup truck includes an inner box frame and a filler pipe assembly. The inner box frame is configured to receive a truck bed. The filler pipe assembly includes a bracket, a first filler pipe, and a second filler pipe. The bracket is mounted to the inner box frame and includes a body defining first and second pipe apertures. The first filler pipe is sized to partially extend through the first pipe aperture. The second filler pipe is sized to partially extend through the second pipe aperture. The first filler pipe may be a diesel fuel pipe in communication with a fuel tank. The second filler pipe may be a diesel exhaust fluid pipe in communication with a fuel tank. An outer body side panel is mounted to the inner box frame and defines a fuel door opening such that the first filler pipe and second filler pipe are accessible via the fuel door opening. The bracket may be located adjacent a C-pillar region of the pickup truck. The bracket may further include a first side member extending in a substantially ninety degree angle from the body. The first side member may include at least one mount flange oriented for securing to a surface of the inner box frame. The bracket may further include a second side member opposite the first side member and extending in a substantially ninety degree angle from the body. The second side member may include another mount flange oriented for securing to another surface of the inner box frame.

A filler pipe bracket of an aluminum pickup truck includes a two-tiered body, a first side member, and a second side member. The two-tiered body includes a first layer defining a first pipe aperture and a second layer defining a second pipe aperture. The first side member extends from the first layer and includes a first mount flange oriented for securing to a portion of an inner pickup box frame. The second side member extends from the second layer and includes a second mount flange for fastening to another portion of the inner pickup box frame. The first pipe aperture may be sized to receive a diesel fuel pipe and the second pipe aperture may be sized to receive a diesel exhaust fluid pipe. The mount flanges may be arranged with the body such that a pipe extending through one of the first pipe aperture or the second pipe aperture is oriented at substantially a forty five degree angle relative to an outer body panel of the pickup truck. The portion of the inner pickup box frame may define a first surface defining a plane normal to a fore and aft orientation of the inner pickup box frame. A second surface of the inner pickup box frame may extend transversely inboard relative to the plane and the second mount flange may be oriented for securing to the second surface. The bracket may further include an outer body panel defining a fuel door opening. The mount flanges and outer body panel may be arranged with one another such that the first pipe aperture and the second pipe aperture are accessible via the fuel door opening. The flanges may be located adjacent a C-pillar of the pickup truck.

A filler pipe bracket assembly of an aluminum pickup truck includes an inner pickup box frame and a bracket. The bracket includes a tiered body, a first side member, a second side member, and an upper flange. The tiered body includes a first layer defining a fuel pipe aperture and a second layer defining an exhaust pipe aperture. The first side member extends from the first layer and includes first and second mount flanges. The second side member extends from the second layer and includes a third mount flange. The upper flange extends from an upper portion of the second layer. The flanges are oriented to accommodate surface features of the inner pickup box frame for mounting thereto. The inner box frame may define a first surface of the surface features in a plane normal to a fore and aft orientation of the inner box frame. The upper flange may extend from the second layer for securing to the first surface in another plane substantially parallel to the plane normal to the fore and aft orientation of the inner box frame. A first surface of the surface features may define a plane normal to a fore and aft orientation of the inner pickup box frame. A second surface of the surface features may extend transversely inboard relative to the plane and the third mount flange may be oriented for securing to the second surface. A third surface of the surface features may extend transversely inboard from the plane at substantially ninety degrees and the side members may define planes substantially parallel with the third surface. A fourth surface of the surface features may extend downward and transversely inboard relative to the plane and the first mount flange may be mounted thereto. The assembly may further include an outer body panel defining a fuel door opening arranged with the inner pickup box frame such that the fuel pipe aperture and the exhaust pipe aperture are accessible via the fuel door opening. The assembly may further include a fuel door assembly mounted to the outer body panel and including a fuel door mounted for rotation to selectively provide access to the fuel pipe aperture and the exhaust pipe aperture.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
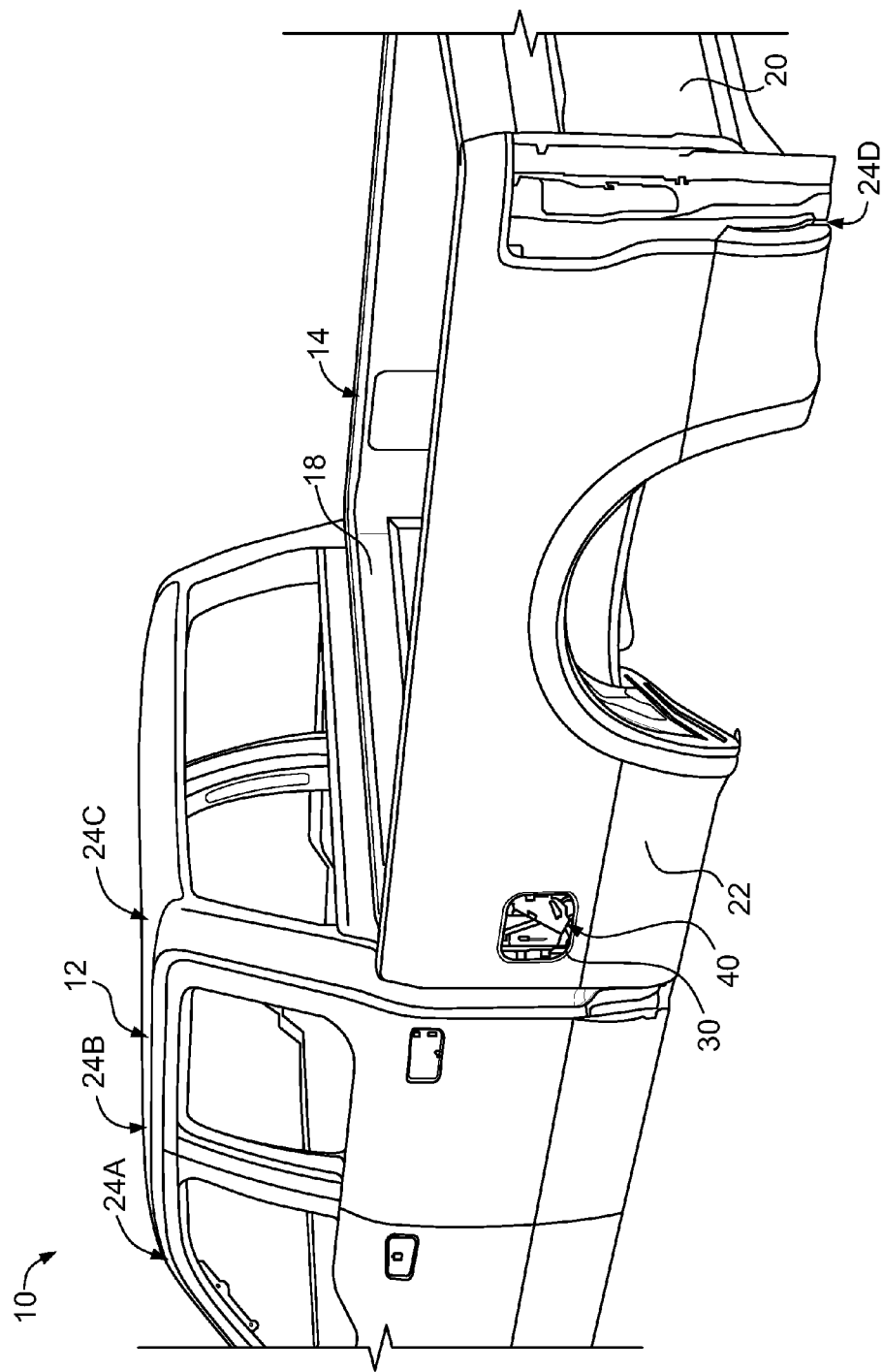
FIG. 1 is a partial rear perspective view of a vehicle.

Referring to FIG. 1, an example of a vehicle 10 is illustrated that includes a cabin 12 and a truck box 14 supported by a vehicle chassis (not shown). The vehicle 10 may be, for example, a pickup truck comprising a majority of aluminum components. The truck box 14 includes a bed (not shown) having a forward end adjacent to the cabin 12 and a rear end opposite the forward end. The bed supports a header 18 at the forward end and a tailgate 20 at the rear end. The tailgate 20 is mounted to the bed for rotation. The bed may also support body side panels. For example, an outer body side panel 22 may be mounted to the bed.

In this example, the vehicle 10 may include an A-pillar region 24a, a B-pillar region 24b, a C-pillar region 24c, and a D-pillar region 24d. The illustrated vehicle 10 is a four door configuration; however other configurations, such as a two door configuration may be adopted to incorporate the disclosed concepts. Alternate configurations may include different pillar region references than vehicle 10. The outer body side panel 22 may be secured to the header 18 at respective regions referred to as forward box pillar regions of the truck box 14 or the C-pillar regions 24c herein. The tailgate 20 rotates from at least an open position to a closed position. In the closed position as shown in FIG. 1, each lateral end of the tailgate 20 may be removably attached to the outer body side panel 22 a region referred to as rear box pillar regions or the D-pillar regions 24d herein. The outer body side panel 22 may define a fuel door cutout 30 adjacent the C-pillar region 24c. The fuel door cutout 30 may be sized to provide access to a filler pipe bracket assembly further described below. Components of the vehicle 10, such as the tailgate 20 and the outer body side panel 22, may be made of five thousand series or six thousand series aluminum alloy.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

Figure 2:
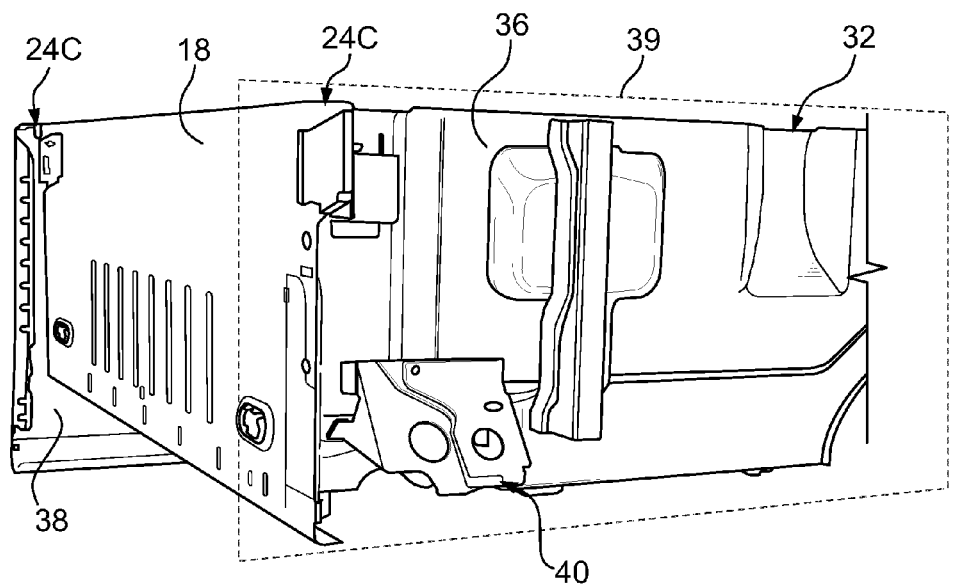
FIG. 2 is a perspective view of an example of a pickup truck box frame of the vehicle of FIG. 1.
Figure 3:
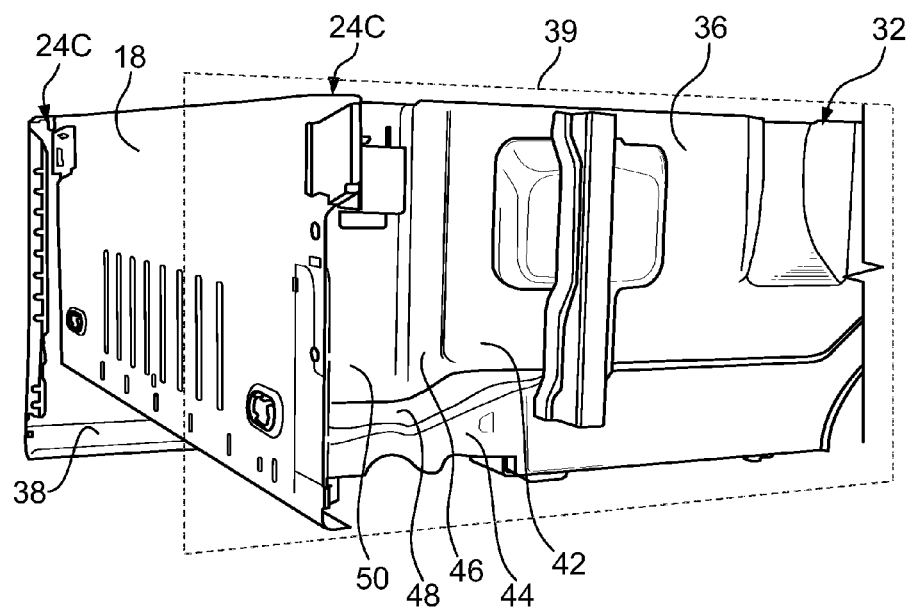
FIG. 3 is a perspective view of the example of the pickup truck box frame of FIG. 2 shown with a filler pipe bracket mounted thereto.

FIGS. 2 and 3 show an example of an inner truck box frame 32 of the truck box 14. The inner truck box frame 32 may include a first inner side panel 36, a second inner side panel 38, and the header 18 disposed therebetween. The filler pipe bracket assembly may include a filler pipe bracket 40 mounted to an outer surface of the first inner side panel 36. Other examples of similar pipe bracket assemblies may be mounted to steel outer body panels. In these other examples the steel outer body panel may assist in providing stiffness for pipes mounted to the bracket assemblies. However, an aluminum outer body panel may provide less stiffness for a pipe bracket assembly and cause customer dissatisfaction. Mounting the filler pipe bracket 40 directly to the inner truck box frame 32 may provide more support to filler pipes in contrast to a configuration in which the filler pipe bracket 40 is mounted to an aluminum outer body panel.

The outer surface of the first inner side panel 36 may define a plane 39 and a plurality of features. For example, the plane 39 may be defined as a plane normal to a fore and aft orientation of the first inner side panel 36. The first inner side panel 36 may define a first surface 42, a second surface 44, a third surface 46, a fourth surface 48, and a fifth surface 50. The first surface 42 may define the plane 39 normal to a fore and aft orientation of the inner truck box frame 32 and the vehicle 10. The first surface 42 may extend longitudinally relative to the vehicle 10. The second surface 44 may extend transversely inboard at an offset angle relative to the plane 39. The third surface 46 may extend transversely inboard and offset at an angle relative to the plane 39. The fourth surface 48 may extend downward, transversely inboard, and at an angle relative to the plane 39. The fifth surface 50 may be offset transversely from the plane 39 and substantially parallel therewith.

Figure 4:
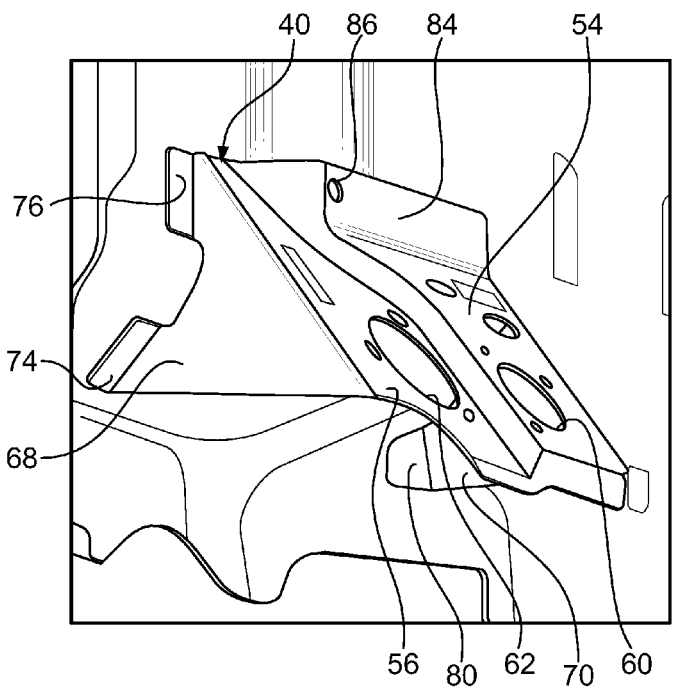
FIG. 4 is another perspective view of the pipe filler bracket of FIG. 2.
Figure 5:
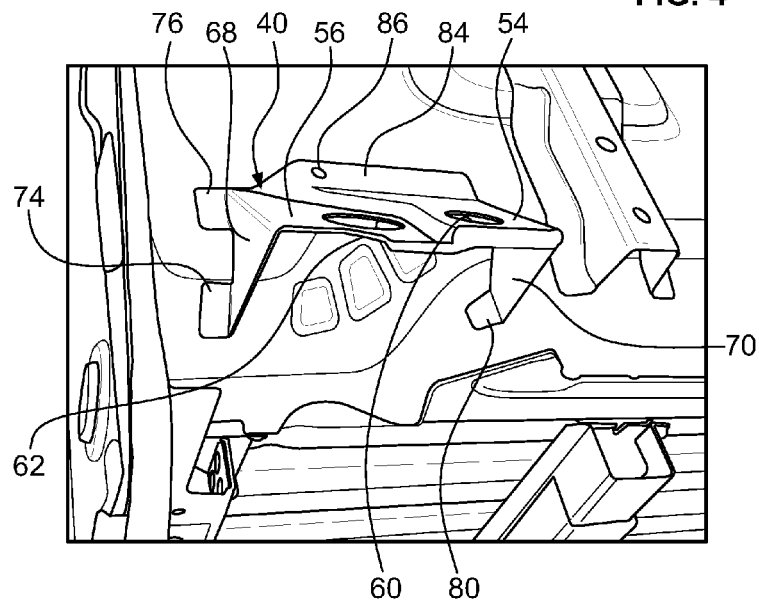
FIG. 5 is yet another perspective view of the pipe filler bracket of FIG. 2.

The filler pipe bracket 40 may include features to accommodate installation to the surface features defined by the first inner side panel 36. For example and now additionally referring to FIGS. 4 and 5, the filler pipe bracket 40 may define a two-tiered structure along with a pair of side supporting members. A body of the filler pipe bracket 40 may define a first layer 54 and a second layer 56 offset from one another in a two-tiered structure. The first layer 54 may define a first pipe cutout 60 and the second layer 56 may define a second pipe cutout 62. The pipe cutouts may be sized for a portion of a filler pipe to extend therethrough. The filler pipe bracket 40 may be mounted to the inner truck box frame 32 such that the first layer 54 and the second layer 56 extend at an angle relative to the plane 39. For example, the first layer 54 and the second layer 56 may extend at an angle such that a filler pipe extending through the first pipe cutout 60 or the second pipe cutout 62 is oriented in a convenient manner for access by a user. In one example, the first layer 54 and the second layer 56 may extend at an angle substantially equal to forty five degrees relative to the plane 39.

A first side member 68 and a second side member 70 may extend at a substantially ninety degree angle from the body of the filler pipe bracket 40. The first side member 68 and the second side member 70 may be substantially perpendicular to the plane 39. The first side member 68 may include a first mount flange 74 and a second mount flange 76. The first mount flange 74 may extend at an angle from the first side member 68 and may be secured to the fourth surface 48 of the inner truck box frame 32. For example, the first mount flange 74 may be riveted to the fourth surface 48 and may be oriented at an angle consistent with an angle of the fourth surface 48. The second mount flange 76 may extend from the first side member 68 and be secured to the fifth surface 50 of the inner truck box frame 32. For example, the second mount flange 76 may be riveted to the fifth surface 50 and may be oriented at an angle consistent with an angle of the fifth surface 50. The second side member 70 may include a third mount flange 80. The third mount flange 80 may be secured to the second surface 44 of the inner truck box frame 32 and may be oriented at an angle consistent with an angle of the second surface 44. Each of the mount flanges may be arranged with surfaces of the inner truck box frame 32 for securing thereto. An upper portion 84 of the filler pipe bracket 40 may extend in a plane substantially parallel with the plane 39. The upper portion 84 may define an aperture 86 for a fastener to extend therethrough.

Figure 6:
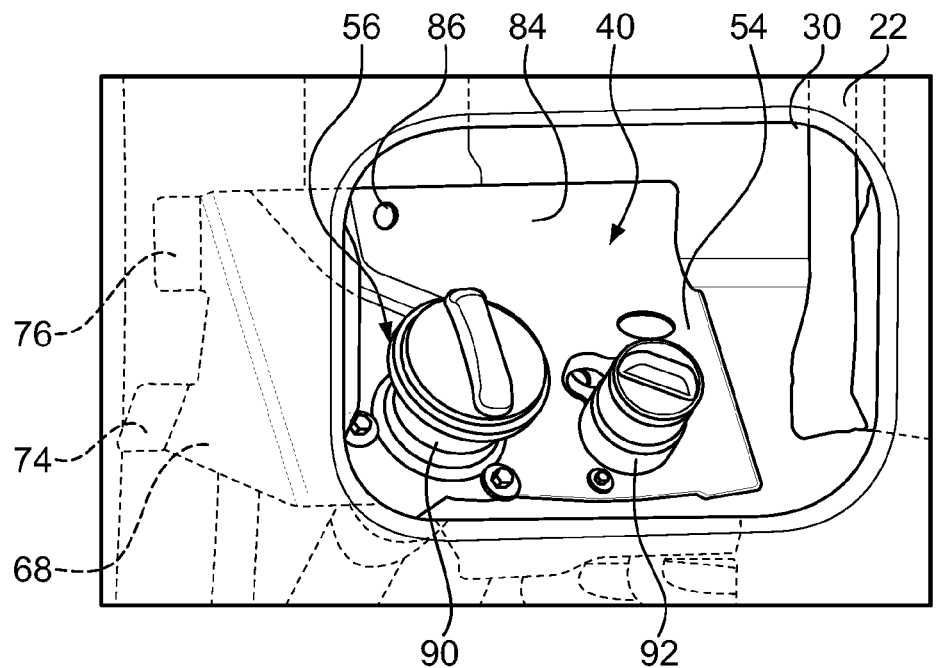
FIG. 6 is a perspective view of the example of the pipe filler bracket of FIG. 2 shown with a portion of an outer body panel.
Figure 7:
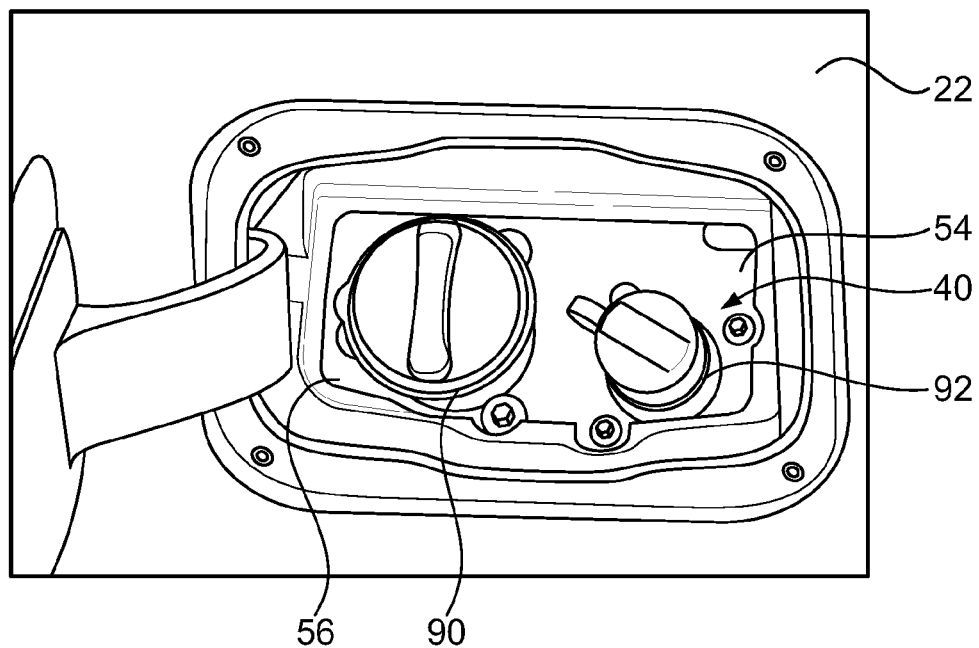
FIG. 7 is a perspective view of an example of a pipe filler bracket mounted to the pickup truck box of the vehicle of FIG. 1.

FIGS. 6 and 7 show additional components of the filler pipe bracket assembly. For example, the filler pipe bracket assembly may include a first pipe 90 and a second pipe 92. The first pipe 90 may be, for example, a diesel fuel pipe in communication with a fuel tank (not shown) of the vehicle 10. The first pipe 90 may include a cap and may be sized to receive fuel from an external fuel pump (not shown). The second pipe 92 may be, for example, a diesel exhaust pipe in communication with the fuel tank of the vehicle 10. The second pipe 92 may be sized to assist in removing vapors from the fuel tank of the vehicle 10. The first pipe 90 may partially extend through the first pipe cutout 60 and the second pipe 92 may extend through the second pipe cutout 62. The filler pipe bracket assembly and the outer body side panel 22 may be arranged with one another such that first pipe 90 and the second pipe 92 are accessible through the fuel door cutout 30 of the outer body side panel 22 when the filler pipe bracket assembly is mounted to the first inner side panel 36.

Figure 8:
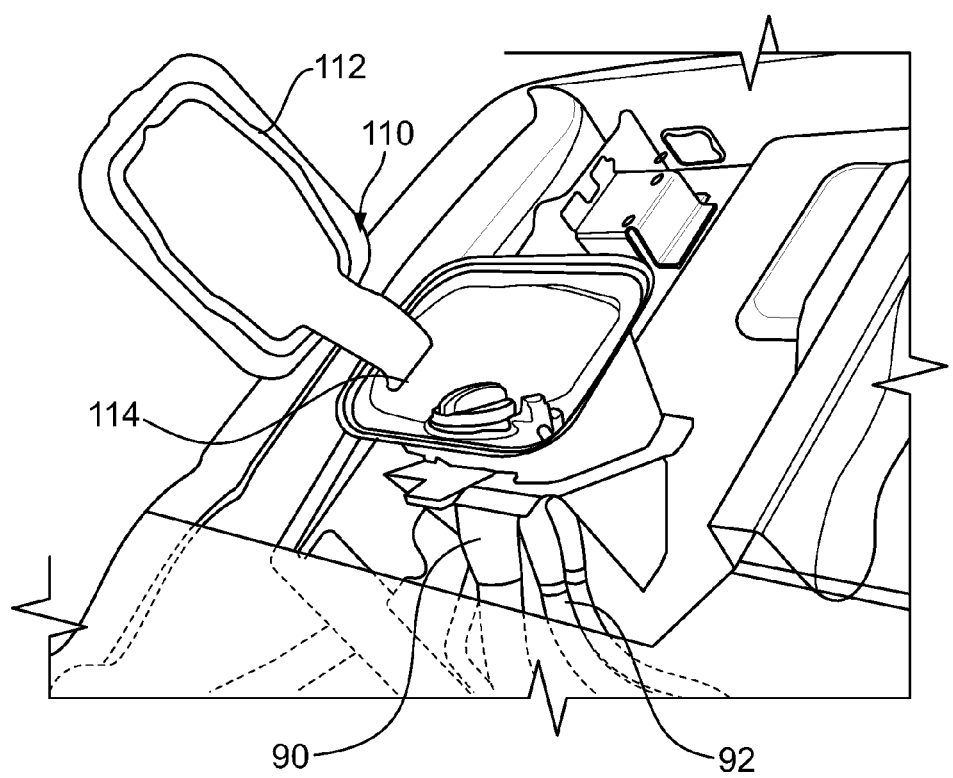
FIG. 8 is a perspective view showing an example of a cover assembly shown with a portion of an outer body panel.

FIG. 8 shows an example of a fuel door assembly 110 which may be mounted to the outer body side panel 22. The fuel door assembly 110 may include a fuel door 112 mounted for pivoting relative to a housing 114. The fuel door assembly 110 may be sized for mounting to the outer body side panel 22 at the fuel door cutout 30. The fuel door assembly 110 may be arranged with the filler pipe bracket 40 such that the fuel door 112 may open to provide access to the first pipe 90 and the second pipe 92.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. An aluminum pickup truck comprising:
    an inner box frame to receive a truck bed; and
    a filler pipe assembly including
        a bracket mounted to the inner box frame and including a body defining first and second pipe apertures and a first side member extending in a substantially ninety-degree angle from the body including a mount flange oriented for securing to an inner box frame surface,
        a first filler pipe sized to partially extend through the first pipe aperture, and
        a second filler pipe sized to partially extend through the second pipe aperture.

2. The pickup truck of claim 1, wherein the first filler pipe is a diesel fuel pipe in communication with a fuel tank.

3. The pickup truck of claim 1, wherein the second filler pipe is a diesel exhaust fluid pipe in communication with a fuel tank.

4. The pickup truck of claim 1 further comprising an outer body side panel mounted to the inner box frame and defining a fuel door opening such that the first filler pipe and second filler pipe are accessible via the fuel door opening.

5. The pickup truck of claim 1, wherein the bracket is located adjacent a C-pillar region of the pickup truck.

6. The pickup truck of claim 1, wherein the bracket further includes a second side member opposite the first side member and extending in a substantially ninety-degree angle from the body, the second side member including another mount flange oriented for securing to another surface of the inner box frame.

7. An aluminum pickup truck filler pipe bracket comprising:
    a two-tiered body including first and second layers each defining a pipe aperture;
    a first side member extending from the first layer and including a first mount flange oriented for securing to a portion of an inner box frame; and a second side member extending from the second layer and including a second mount flange for fastening to another portion of the inner box frame.

8. The bracket of claim 7, wherein one of the pipe apertures is sized to receive a diesel fuel pipe and the other of the pipe apertures is sized to receive a diesel exhaust fluid pipe.

9. The bracket of claim 7, wherein the mount flanges are arranged with the body such that a pipe extending through one of the pipe apertures is oriented at substantially a forty-five-degree angle relative to an outer body panel of the pickup truck.

10. The bracket of claim 7, wherein the portion of the inner box frame defines a first surface defining a plane normal to a fore and aft orientation of the inner box frame, wherein a second surface of the inner box frame extends transversely inboard relative to the plane, and wherein the second mount flange is oriented for securing to the second surface.

11. The bracket of claim 7 further comprising an outer body panel defining a fuel door opening, wherein the mount flanges and outer body panel are arranged with one another such that the pipe apertures are accessible via the fuel door opening.

12. The bracket of claim 7, wherein the flanges are located adjacent a C-pillar of the pickup truck.

13. A filler pipe bracket assembly of an aluminum pickup truck comprising:
    an inner pickup box frame; and
    a bracket including
        a tiered body including a first layer defining a fuel pipe aperture and a second layer defining an exhaust pipe aperture,
        a first side member extending from the first layer and including first and second mount flanges,
        a second side member extending from the second layer and including a third mount flange, and
        an upper flange extending from an upper portion of the second layer,
    wherein the flanges are oriented to accommodate surface features of the inner pickup box frame for mounting thereto.

14. The assembly of claim 13, wherein the inner box frame defines a first surface of the surface features in a plane normal to a fore and aft orientation of the inner box frame, and wherein the upper flange extends from the second layer for securing to the first surface in another plane substantially parallel to the plane normal to the fore and aft orientation of the inner box frame.

15. The assembly of claim 13, wherein a first surface of the surface features defines a plane normal to a fore and aft orientation of the inner pickup box frame, wherein a second surface of the surface features extends transversely inboard relative to the plane, and wherein the third mount flange is oriented for securing to the second surface.

16. The assembly of claim 15, wherein a third surface of the surface features extends transversely inboard from the plane at substantially ninety-degrees, and wherein the side members define planes substantially parallel with the third surface.

17. The assembly of claim 16, wherein a fourth surface of the surface features extends downward and transversely inboard relative to the plane, and wherein the first mount flange is mounted thereto.

18. The assembly of claim 13 further comprising an outer body panel defining a fuel door opening arranged with the inner pickup box frame such that the fuel pipe aperture and the exhaust pipe aperture are accessible via the fuel door opening.

19. The assembly of claim 18 further comprising a fuel door assembly mounted to the outer body panel and including a fuel door mounted for rotation to selectively provide access to the fuel pipe aperture and the exhaust pipe aperture.

* * * * *